(12) United States Patent
Dahlen et al.

(10) Patent No.: US 9,961,596 B2
(45) Date of Patent: May 1, 2018

(54) DETERMINATION OF A CAPABILITY OF A USER EQUIPMENT

(71) Applicant: TELIASONERA AB, Stockholm (SE)

(72) Inventors: Anders Dahlen, Vasterhaninge (SE); Ulf Nilsson, Vasterhaninge (SE)

(73) Assignee: TELIA COMPANY AB, Stockholm (SE)

( * ) Notice: Subject to any disclaimer, the term of this patent is extended or adjusted under 35 U.S.C. 154(b) by 671 days.

(21) Appl. No.: 14/163,188

(22) Filed: Jan. 24, 2014

(65) Prior Publication Data

US 2014/0213258 A1 Jul. 31, 2014

(30) Foreign Application Priority Data

Jan. 25, 2013 (EP) .................................... 13152642

(51) Int. Cl.
| | |
|---|---|
| H04W 36/00 | (2009.01) |
| H04W 8/22 | (2009.01) |
| H04W 88/02 | (2009.01) |
| H04W 48/18 | (2009.01) |
| H04W 36/14 | (2009.01) |

(52) U.S. Cl.
CPC ......... *H04W 36/0083* (2013.01); *H04W 8/22* (2013.01); *H04W 36/14* (2013.01); *H04W 48/18* (2013.01); *H04W 88/02* (2013.01)

(58) Field of Classification Search
CPC .............................. H04W 88/02; H04W 48/18
USPC ...................................... 455/435.2, 436–439
See application file for complete search history.

(56) References Cited

U.S. PATENT DOCUMENTS

| | | | |
|---|---|---|---|
| 2005/0075129 A1* | 4/2005 | Kuchibhotla | H04W 48/18 455/552.1 |
| 2006/0073831 A1 | 4/2006 | Guyot et al. | |
| 2010/0242103 A1* | 9/2010 | Richardson | H04W 36/0061 726/7 |
| 2012/0046034 A1* | 2/2012 | Lu | H04W 48/18 455/435.2 |
| 2013/0235785 A1* | 9/2013 | Sebire | H04W 48/10 370/312 |

(Continued)

OTHER PUBLICATIONS

European Search Report dated Jun. 17, 2013, corresponding to the Foreign Priority Application No. EP 13 15 2642.

(Continued)

*Primary Examiner* — Vladimir Magloire
*Assistant Examiner* — Jaime Holliday
(74) *Attorney, Agent, or Firm* — Young & Thompson

(57) ABSTRACT

A method for determining a capability of a user equipment. The user equipment is served by a non-shared network in a first place. The non-shared network is configured to transmit a message to the user equipment, the message including information on at least two PLMN identities. The user equipment is configured to deliver a response message from which it is determined if the response message includes information field reserved for at least one PLMN identity in the transmitted message. On a basis of an existence of the information field in the response message it can be determined that the user equipment supports network sharing. In other case it is determined that the user equipment is not supporting network sharing. A network node and a system implementing at least part of the method are also described.

12 Claims, 2 Drawing Sheets

(56) References Cited

U.S. PATENT DOCUMENTS

2015/0172965 A1* 6/2015 Jeong .................... H04W 36/14
370/331

OTHER PUBLICATIONS

Universal Mobile Telecommunication System (UMTS); LTE; Network Sharing; Architecture and Functional Description (3GPP TS 23.251 version 11.4.0 Release 11); Jan. 1, 2013; XP014092813.
3rd Generation Partnership Project; Technical Specification Group Services and System Aspects; Service aspects and requirements for network sharing (Release 11); 3GPP TR 22.951 v11.0.0 (Sep. 2012), XP50649533.

* cited by examiner

DETERMINATION OF A CAPABILITY OF A USER EQUIPMENT

TECHNICAL FIELD

The invention concerns in general the technical field of wireless telecommunications. Especially the invention concerns obtaining information on the user equipment characteristics in a wireless communication network.

BACKGROUND OF THE INVENTION

In an area there can be one or more telecommunications networks with different technologies operated by one or more telecom operators. Such an environment increases the complexity of a network selection by the user equipment (UE), but it is also inefficient from operators' point of view due to high investment costs of a network or part of it. In order to improve the efficiency the operators may have agreed on sharing at least part of their networks, e.g. in a situation when a network is owned by some companies in a joint ownership basis. As a result, operators may establish an own network for certain areas, but co-utilize a network in some other areas in order to provide extensive communication services to the subscribers.

There exist different models for the network sharing. Mainly, the models relate to the extent of sharing the network and/or part of it. In principle, it is possible to share any part of the network, but basically one can talk about sharing a core network, radio network or both of them. The sharing shall also be understood as covering a share of at least one network element and/or radio resources. More specifically, a network sharing architecture shall, according to at least 3GPP Specification TS 23.251 V11.0.0 (2011-09), allow different core network operators to connect to a shared radio access network. The operators do not only share the radio network elements, but they may also share the radio resources, i.e. sharing spectrum.

In order to utilize shared networks the UE must be capable of it. In practice this means that the UE must be able to receive and utilize the additional broadcast system information concerning available core network operators in the shared network. The term 'core network operator' shall be understood as an operator that provides services to subscribers as one of multiple serving operators that share at least a radio access network. The additional broadcast system information comprises identities of the network operators involved in the network sharing. The network operators in the shared environment are identified with public land mobile network identities (PLMN-id), which consists of a Mobile Country Code (MCC) and a two to three digit Mobile Network Code (MNC). In shared UTRAN, the network operators PLMN identities are broadcasted in a Multiple PLMN list information element. When the term multiple PLMN or multiple PLMN-id is used in this document it refers to the PLMN identities which are broadcasted in a Multiple PLMN list information element.

Based on the capability of utilizing the additional broadcast system information the user equipments can be categorized into two groups. First group are such UEs, which support network sharing in the sense that they are able to select a core network (CN) operator as the serving operator within a shared network on the basis of the additional broadcast system information. Such UEs are called supporting UEs in this context. Correspondingly, second group of UEs i.e. non-supporting UEs do not support network sharing in the sense that they ignore the additional broadcast system information that is specific for network sharing, i.e. the PLMN identities of the network operators. In that case, the UEs read common PLMN, which is the PLMN identity indicated to the UE as the serving operator.

The importance of being aware of the capability of a UE by a network becomes obvious in a mobility situation. Namely, if a UE is moving from a non-shared network to a shared network, it would be advantageous to know in advance if the UE supports network sharing or not. With this information the network is able to optimize radio resource management strategy accordingly. For example, the network may select to handover a UE to a RAT or frequency band that is not in a shared network configuration if the UE does not support network sharing to at least a certain RAT. The source network may also perform prioritization at e.g. Circuit Switched (CS) fallback or redirect or cell change order or cell reselection. The advantage in avoiding sending a non-supporting UE to a shared network is that non-supporting UEs are subject for CS/PS (Packet Switched) coordination, and in this process the subscriber may be lost to another operator that is part of the shared network. Another advantage in knowing in advance if the UE supports network sharing or not is that it is then possible to arrange the source network to inform the target network into which PLMN identity the UE in question shall be registered to. If the capability information of the UE is not known, the target network may provide both multiple PLMN-ids and the identity of the common PLMN to the UE, but does not know if the UE will use one of the multiple PLMNs or the common PLMN, at least as long as the UE has an established NAS (Non Access Stratum) signaling connection in the target network. In other words, since the target network does not know which PLMN the UE will use, it is not capable of determining if the UE ought to be registered to the Common PLMN or to one of the PLMN identities in the Multiple PLMN List. If the target network registers all UEs in a multiple PLMN-id then non-supporting UEs will be registered to wrong PLMN, since they are supposed to be registered in the common PLMN. If the target network registers all UEs in the common PLMN then supporting UEs will be registered to wrong PLMN, since they are supposed to be registered in a multiple PLMN-id. When the NAS signaling connection ends, the supporting UE indicates a PLMN identity, which thus indicates the capability of the UE. If the target network handles all UEs as non-supporting UEs then supporting UE may be subject of rerouting (CS/PS coordination) to another operator than intended.

As said, when the capability of the UE is known by the non-shared network in the handover situation, the PLMN to be used for registration in shared cell can be optimally selected by signaling between the non-shared and shared networks. More precisely, the non-shared network may use the information at handover signaling towards the shared network. The information may be used in taking decisions in source network, for example, with respect to the handover (or other mobility procedures) of non-supporting UEs to another network than the shared network if that is preferred and possible.

SUMMARY OF THE INVENTION

An objective of the invention is to present a method, a network node and a system for determining a capability of a user equipment with respect to utilizing network sharing information. Another objective of the invention is that the method, a network node and a system for provide information which can be utilized in a management of an UE within a network and especially in a context of handover. The objects of the invention are reached by a method, a network node and a system as defined by the respective independent claims.

According to a first aspect, a method for determining a capability of a user equipment, wherein the user equipment is arranged to communicate with a non-shared network serving the user equipment, is provided. The method comprises at least the steps of transmitting, by a non-shared network, a message to the user equipment, the message comprising information on at least two PLMN identities; receiving a response message from the user equipment; determining if the response message from the user equipment comprises at least one information field reserved for at least one PLMN identity; and determining on a basis of an existence of the information field in the response message that the user equipment is configured to support network sharing and determining on basis of absence of the information field in the response message that the user equipment is not configured to support network sharing.

In the method the message may be transmitted over radio resource control messaging. For example, the information comprising information on at least two PLMN identities may be transmitted in one of the following messages: ACTIVE SET UPDATE, CELL UPDATE CONFIRM, PHYSICAL CHANNEL RECONFIGURATION, RADIO BEARER RECONFIGURATION, RADIO BEARER RELEASE, RADIO BEARER SETUP, TRANSPORT CHANNEL RECONFIGURATION, URA UPDATE CONFIRM.

The at least two PLMN identities in the transmitted message may be the same.

According to the method, the at least one information field reserved for a PLMN identity in the response message may comprise information on at least one of the at least two PLMN identities The method may further comprise a step of delivering information on the at least one of the PLMN identity of the at least two PLMN identities to a target network which is configured to serve the user equipment.

The method may further comprise a step of delivering information on the capability of the user equipment to a target network which is configured to serve the user equipment.

The method may further comprise a step of steering a mobility of the user equipment in the non-shared network on the basis of the network sharing capability of the user equipment.

According to a second aspect, a network node for determining if a user equipment is configured to support network sharing is provided, wherein the network node comprises at least one processor and at least one memory including computer program code. By executing at least portion of the computer program code with the at least one processor the network node is caused to perform: transmit a message to the user equipment, the message comprising information on at least two PLMN identities; receive a response message from the user equipment; determine if the response message from the user equipment comprises at least one information field reserved for at least one PLMN identity in the transmitted message; and determine on a basis of an existence of the information field in the response message that the user equipment is configured to support network sharing and determining on basis of absence of the information field in the response message that the user equipment is not configured to support network sharing.

The network node may be configured to determine if the at least one information field reserved for a PLMN identity in the response message comprises information on at least one of the at least two PLMN identities.

The network node may further be configured to deliver information on the at least one of the PLMN identity of the at least two PLMN identities to a target network which is configured to serve the user equipment.

Alternatively or in addition, the network node may further be configured to deliver information on the capability of the user equipment to a target network which is configured to serve the user equipment.

Alternatively or in addition, the network node may further be configured to steer a mobility of the user equipment in the non-shared network on the basis of the network sharing capability of the user equipment.

According to a third aspect, a system for determining if a user equipment is configured to support network sharing is provided wherein the system comprises at least one user equipment, a source network configured to serve the user equipment, a network node residing in the source network and at least one target network configured to serve the user equipment. The network node within the system is configured to transmit a message to the user equipment, the message comprising information on at least two PLMN identities; receive a response message from the user equipment; determine if the response message from the user equipment comprises at least one information field reserved for at least one PLMN identity; and determine on a basis of an existence of the information field in the response message that the user equipment (110) is configured to support network sharing and determining on basis of absence of the information field in the response message that the user equipment (110) is not configured to support network sharing. The user equipment within the system is configured to transmit a response message to the network node in response to a receipt of the message with at least information field reserved for at least one PLMN identity.

The network node within the system may further be configured to deliver information on the capability of the user equipment to the target network.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF DRAWINGS

FIG. 1 illustrates the environment into which the invention relates to,

DETAILED DESCRIPTION OF THE INVENTION AND ITS ADVANTAGEOUS EMBODIMENTS

Figure 1:
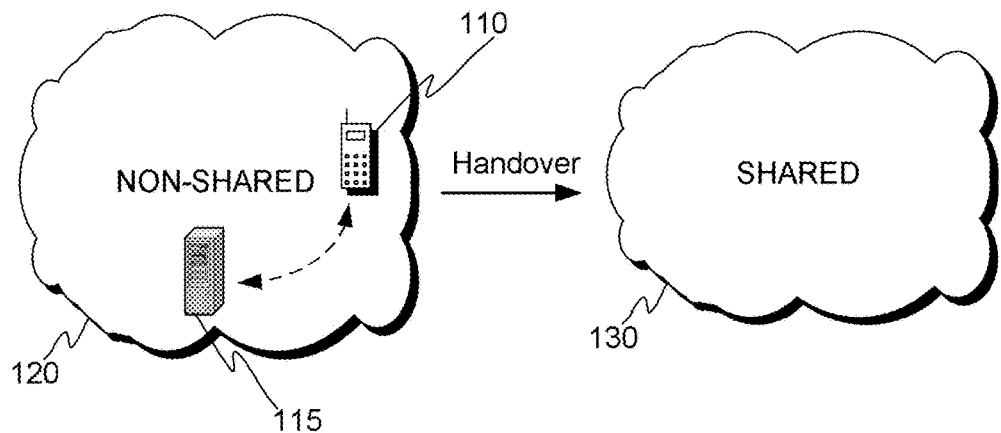

FIG. 1 illustrates a simplified diagram on the problem area into which the current invention relates to. Namely, a user equipment (UE) 110 is served by a non-shared network, which is called as a source network 120 in this description. A non-shared network is in 3GPP specification 23.251 referred to as a conventional network, which is described as a PLMN consisting of radio access network and core network, by which only one serving operator provides services to its subscriber. Subscribers of other operators may receive services in conventional network by national or international roaming. Thus, a non-shared network is here to be interpreted as a network that only sends one PLMN identity on broadcast channel. In other words, there is no Multiple PLMN list broadcasted in a non-shared UTRAN. At a point of time, there arises a need to perform a handover of the UE from the source network to a target network 130, which in this case is so called shared network. A network sharing architecture allows different core network operators to connect to a shared radio access network. The operators do not only share the radio network elements, but may also share the radio resources themselves. The network sharing architecture may be a so-called a Gateway Core Network (GWCN) configuration or a Multi-Operator Core Network (MOCN) configuration. In order to perform the handover in such a manner that the network resources may be optimally used at least some capabilities of the UE 110 shall preferably be known. This enables the registration of the UE 110 to the target network in an efficient manner as the source network 120 may deliver a piece of information to the target network 130 for registering the UE 110 to a common PLMN or to one of the PLMN identities in the Multiple PLMN List. The piece of information delivered to the target network 130 comprises information representing the PLMN that the UE should be registered to, and the target network may interpret it as the capability of the UE 110. More specifically, the delivered piece of information at least indicates a PLMN in the Multiple PLMN list for supporting UEs, and no PLMN identity or the common PLMN of the target network for non-supporting UEs. As a consequence, the delivered piece of information at least indicates if the UE 110 supports network sharing or not i.e. if the UE 110 is able to utilize the broadcast system information or not. The target network registers non-supporting UEs in common PLMN and supporting UEs in one of the PLMN identities in the broadcasted Multiple PLMN list. The handover in this context refers to a process of transferring an ongoing call or data session from a source network 120 to a target network 130 as described. The optimal time for the handover as such is determined through normal network procedures i.e. UE measurements and analysis of the measurement results by the network. Further, both the networks comprise necessary elements to establish wireless communication of user equipment as well as controlling and management of the system as known. However, in this context both the non-shared source and the shared target networks are based the same radio access technology (RAT), e.g. on $3^{rd}$ generation of mobile telecommunication technology, such as UMTS, W-CDMA, TD-SCDMA, HSPA+, CDMA2000, or second generation of mobile telecommunication technology, such as GSM, GERAN or any derivative of these.

The capability of the UE may be determined with a communication between a network node 115 and the UE 110 in the source network. The communication is indicated with a dashed arrow in FIG. 1. The communication is typically performed indirectly via necessary network elements, such as base stations, controllers and similar. In some context even a direct communication between the UE 110 and the network node 115 may be arranged. The determined network sharing capability of the UE is applicable only for the RAT of source network. In other words, the information derived in the source network is applicable in those target networks, which are implemented with the same RAT as the source network.

Figure 2:
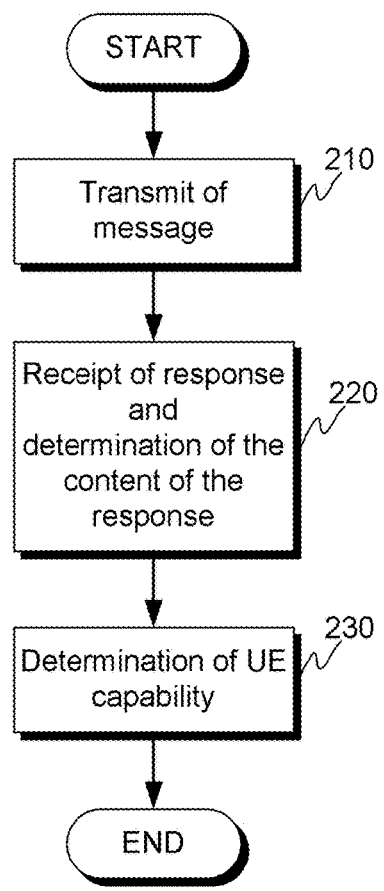
FIG. 2 illustrates an example of the method according to the invention.

An example of the method according to the invention is illustrated in FIG. 2 in which it is shown at least some of the method steps for determining a capability of a UE 110 to utilize broadcast system information i.e. if the UE supports network sharing. In addition to understanding additional information on broadcast channel, a supporting UE is also configured to understand additional information sent in some dedicated Radio Resource Control (RRC) messages and is also configured to indicate that it understands this additional information. The source network may utilize this capability of supporting UEs. Here, the UE 110 is attached to the source network 120, which is a non-shared network. A network node 115 residing in the source network 120, i.e. in a non-shared network, may be configured to create and transmit 210 a message to the UE 110 wherein the message comprises at least two PLMN identities. The PLMN identities may be included in a specific information element of the message. According to some examples of the invention the information element is a "CN Information Info" or "CN Information Info Full", which may be included in many message types in a signaling relating to radio resource control. The both mentioned information elements comprise at least two information fields into which the PLMN identities, one for each field, as described can be added i.e. fields "PLMN Identity" and "Primary PLMN Identity" for example. Thus, as the normal operation in the non-shared network comprises only one PLMN identity, according to an example of the invention an additional PLMN identity is added to the RRC message in order to achieve the desired operation, as will be described later in this document. The "CN Information Info" may be delivered in the following messages: ACTIVE SET UPDATE, CELL UPDATE CONFIRM, PHYSICAL CHANNEL RECONFIGURATION, RADIO BEARER RECONFIGURATION, RADIO BEARER RELEASE, RADIO BEARER SETUP, TRANSPORT CHANNEL RECONFIGURATION, URA UPDATE CONFIRM messages. The above mentioned list of messages is based on existing UTRAN (Universal Terrestrial Radio Access Network) telecommunication standards, which define the messages and the content of the messages as such. However, any message which may carry the mentioned information and which causes the UE 110 to operate in a manner as will be described may be applied here.

According to an example of the invention the PLMN identities in the message are preferably the same, since the non-shared source network that is currently serving the UE has only one PLMN identity.

Above it is said that the source network 120 is configured to create and transmit the message to the UE 110 in question. More specifically, a network node for creating and initiating the transfer of the mentioned message may be, according to an example of the invention, a Radio Network Controller (RNC) or BSC in the radio network side. The message is configured to be delivered from the network node over a radio access network (RAN) interface to the UE 110.

As the UE 110 receives the RRC message comprising information on at least two PLMN identities, which message complies with some predetermined rules, the UE 110 is configured to function in a predefined manner. If the UE 110 supports network sharing i.e. is capable of utilizing the additional broadcast system information, the UE 110 is configured to deliver a response message to a network node in the source network 120. More specifically, the UE 110 is configured to respond if the primary PLMN identity comprises an additional PLMN identity. Especially, the UE 110 is configured to respond e.g. when there is a need to perform a location update and there is no signaling connection to the CS domain, or when there is a need to perform a routing area update and there is no signaling connection to the PS domain. According to an example of the invention it may be enough for determining the capability of the UE 110 if the response message from the UE comprises at least one information field reserved for at least one PLMN identity. The response message may comprise the same PLMN identity as the additional PLMN identity in the Primary PLMN field that was included in the message delivered from the source network 120 to the UE 110 if the UE 110 supports the network sharing. The response may be implemented with an INITIAL DIRECT TRANSFER message over radio resource control signaling, for example. In other words, if the UE 110 is configured to be capable of retrieving the information on at least one PLMN identity of the at least two PLMN identities from the transmitted message and deliver at least pre-agreed piece of information, such as at least one information field reserved for at least one PLMN identity, back to the source network 120, it can be concluded that the UE 110 is capable for network sharing. If the piece of information, such as at least one information field alone or with at least one PLMN identity, does not exist in the response message, it can be concluded that the UE 110 is not capable for network sharing. Thus, the network node in the source network 120 is configured to receive the response message from the UE 110 and determine the content of the response message 220.

Figure 3:
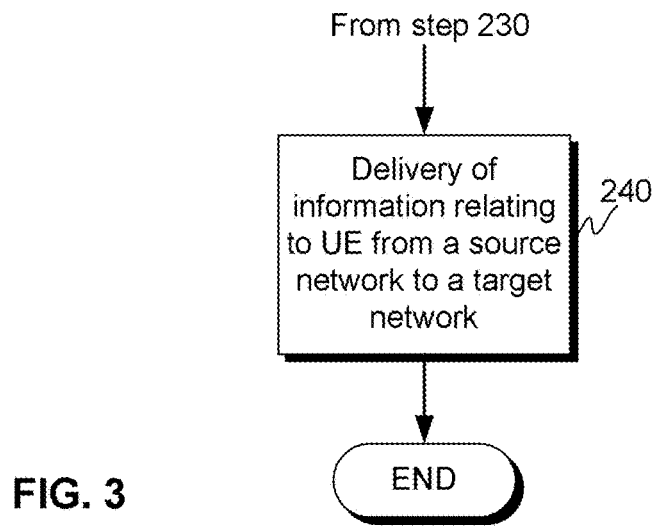
FIG. 3 illustrates a further aspect relating to the method according an example of the invention.

Next, the network node 115 in the source network 120 is configured to determine, on a basis of an existence of at least one information field with or without PLMN identity in the response message, such as INITIAL DIRECT TRANSFER message, the capability of the UE 110 as regards to network sharing. If it is determined that the response message, such as INITIAL DIRECT TRANSFER message, comprises at least one information field reserved for the PLMN identity, with or without at least one PLMN identity, it can be interpreted that the UE 110 supports network sharing i.e. it is capable of using broadcast system information. If it is determined that the response message does not comprise the information field, or information on at least one PLMN identity, it can be interpreted that the UE 110 does not support network sharing as described earlier. It is important to notice that the PLMN identity within the response message may also be any PLMN identity, but one of the PLMN identities in the transmitted message. The invention is not anyhow limited to only such an alternative that the response message shall comprise the same PLMN identity as was delivered to the UE 110. For sake of clarity, in some example of the invention the determination of the capability of the UE may be based on an existence of at least one information field reserved for at least one PLMN identity in the response message. In some other example, the determination may be based on an existence of a PLMN identity in the at least one information field, or in the response message in general. As the network node 115 in the source network 110 becomes aware of the capability of the UE 110 the method according to the invention may further comprise a step of transmitting information of PLMN identity or on the capability of the UE 110 to the target network 130 as depicted in FIG. 3 with a reference 240. In such a manner it is possible to deliver information on the UE 110 to the target network 130 before the handover is to be happened or rather during the handover preparation signaling. This enables preparation in the target network 130 to register the UE 110 in an appropriate manner either to the common PLMN or to one of the multiple PLMNs according to received PLMN identity from source network or received capability of the UE 110 as the target network 130 operates in a shared network configuration. The PLMN identity or capability information of the UE 110 may be delivered between the network nodes in the source and target network performing similar functionalities, such as SGSNs (Serving GPRS Support Node) or MSCs (Mobile Switching Center) as the network node 115 is configured to deliver the determined information on the capability of the UE 110 to the core network in the non-shared environment. The delivery of information between the networks may be arranged with network signaling, e.g. in a relocation forwarding procedure. It may also be arranged that the signaling does not deliver the capability information of the UE as such, but rather just indicates, e.g. with the signal type, into which category the UE 110 in question belongs to.

In response to the determination of the capability of the UE 110, the source network may be configured to steer mobility of the UE 110. Namely, the source network may select to handover the UE to a RAT or frequency band that is not in a shared network configuration if the UE does not support network sharing. The source network may also perform prioritization at e.g. Circuit Switched (CS) fallback or redirect or cell change order or cell reselection on the basis of the determination. The advantage in avoiding sending a non-supporting UE to a shared network is that non-supporting UEs are subject for CS/PS (Packet Switched) coordination, and in this process the subscriber may be lost to another operator that is part of the shared network.

Figure 4:
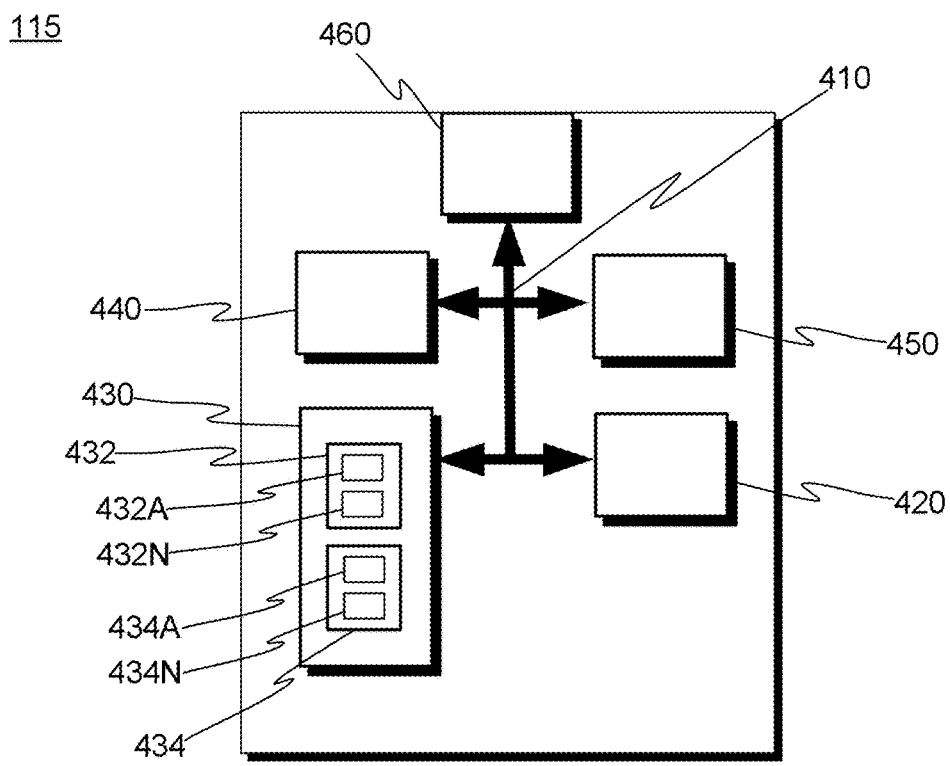
FIG. 4 illustrates an example of the network node according to the invention.

FIG. 4 discloses an example of a network node 115 according to an implementation consistent with the principles of the invention. The network node 115 comprises, for example, a bus 410, a processor 420, a memory 430, input means 440, output means 450, and a communication interface 460. The bus 410 may include means or methods that enable communication among the elements of the network node 115.

The processor 420 may comprise one or more conventional processors, one or more microprocessors, or one or more processing logics, or any combination of these, that interprets and executes instructions defined by portions of computer program code. The memory 430 may comprise a random access memory (RAM) 432 and/or a read only memory (ROM) 434. The RAM 432 may store information and instructions in a form of portions of computer program code 432A-432N for execution by the processor 420. The ROM 434 may include a conventional ROM device or another type of a static storage device that is configured to store static information and instructions in a form of portions of computer program code 434A-434N for use by the processor 420. The RAM 432 and ROM 434 may be implemented with one or more corresponding memory elements.

The input means 440 may comprise a conventional mechanism that permits inputting information to the network node 115, such as a keyboard, a mouse, a pen, a touch screen, voice recognition and/or biometric mechanisms, etc. The output means 450 may comprise a conventional mechanism that outputs information, including a display, a printer, a speaker, etc. The input and output means are not necessarily implemented into the network node 115, but may be coupled to the network node 115 with some known interfaces either wirelessly or in a wired manner.

The communication interface 460 may enable the network node 115 to communicate with other nodes and/or systems, such as networks, as well as with client terminals either directly or indirectly over a network.

The network node 115 may perform the operations as described above in response to the processor 420 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 460. The software instructions may cause the processor 420 to perform method steps and processes as described and thus to enable the operation of the network node 115 as described.

As said, FIG. 4 illustrates an example of the network node 115 according to the invention. The elements disclosed in FIG. 4 do not necessarily exist in all implementations of the network node 115. For example, the network node 115 may not comprise input means 440 and output means 450, but the network node 115 may be accessed through the communication interface 470 with applicable devices and systems. As well, the number and type of memories may vary. As well, the amount of portions of computer program code may depend on the implementation.

The invention also relates to a system implementing the method as described, which system is illustrated in FIG. 1. The system comprises one or more user equipment and at least one communication network comprising a radio access network and a core network, which is a type of non-shared network. The core network comprises one or more network node controlling the operation of the communication network. The radio access network, in turn, comprises one or more base stations and necessary controllers thereto, which also communicate with the network nodes in the core network. Within the system according to an example of the invention a network node 115 residing in a source network 120 is configured to transmit a message to the user equipment wherein the message comprises at least two PLMN identities. The PLMN identities may be included in a specific information element of the message. According to some examples of the invention the information element is a "CN Information Info" or "CN Information Info Full", which may be included in many message types in a signaling relating to radio resource control. The both mentioned information elements comprise at least two fields into which the PLMN identities, one for each field, as described can be added i.e. fields "PLMN Identity" and "Primary PLMN Identity" for example. According to an example of the invention the PLMN identities in the message are preferably the same, since the non-shared source network that is currently serving the UE has only one PLMN identity.

As the UE 110 receives the RRC message comprising information on at least two PLMN identities, which message complies with some predetermined rules, the UE 110 is configured to function in a predefined manner. If the UE 110 supports network sharing i.e. is capable of utilizing the additional broadcast system information, the UE 110 is configured to deliver a response message to a network node in the source network 120. More specifically, the UE 110 is configured to respond if the primary PLMN identity comprises an additional PLMN identity. Especially, the UE 110 is configured to respond e.g. when there is a need to perform a location update and there is no signaling connection to the CS domain, or when there is a need to perform a routing area update and there is no signaling connection to the PS domain.

According to an example of the invention it may be enough for determining the capability of the UE 110 if the response message from the UE comprises a pre-agreed information field, such as a field reserved for PLMN identity or identities. Furthermore, the response message may comprise information field with at least one PLMN identity, such as the additional PLMN identity in the Primary PLMN field that was included in the message delivered from the source network 120 to the UE 110 if the UE 110 supports the network sharing. In principle, information on any PLMN identity may be enough to indicate the same. The response may be implemented with an INITIAL DIRECT TRANSFER message over radio resource control signaling within the system, for example.

If it is determined that the response message, such as INITIAL DIRECT TRANSFER message, comprises pre-agreed information as described, it can be interpreted that the UE 110 supports network sharing i.e. it is capable of using broadcast system information. If it is determined that the response message comprises no pre-agreed information, it can be interpreted that the UE 110 does not support network sharing as described earlier. The invention is not anyhow limited to such an alternative that the response message shall comprise the same PLMN id as was delivered to the UE 110.

As the network node 115 in the source network 110 becomes aware of the capability of the UE 110 the method according to the invention may further comprise a step of transmitting information of PLMN identity or on the capability of the UE 110 to the target network 130 belonging to the system.

Some examples of the invention are described above by mainly referring the application of the invention in 3rd generation mobile telecommunication network. The principle of the invention may also be applied in the 2nd generation mobile telecommunication environment wherein an information element is added in RRC messaging or in a Radio Link Control Packet Data Unit (PDU). In GERAN one possible scenario is that the signaling may be implemented over user plane by using standardized information elements in PDU headers. The information element is only understandable by supporting UEs and the supporting UEs add an information element, or at least part of the content in the information element, in the response message. The information element is such that can be applied in 2nd generation networks, such as a PLMN index.

In any context of the description of the invention it shall be understood that there can be also other element involved in the operation as described. For example, even it is said that the network node is configured to transmit a message to a UE, the communication is not necessarily arranged as a direct communication between the mentioned entities, but may utilize other network nodes and elements, such as base stations, in order to arrange the communication. Such an operation is commonly known and standardized communication. For that reason no detailed description on that is disclosed here.

Some advantageous embodiments according to the invention were described above. The invention is not limited to the embodiments described. The inventive idea can be applied in numerous ways within the scope defined by the claims attached hereto.

The invention claimed is:

1. A method for determining a capability of a user equipment for preparing for a handover from a source network serving the user equipment to a target network, the user equipment being configured to communicate with a non-shared source network serving the user equipment, the method comprising:
   transmitting, by the non-shared source network, a radio resource control message to the user equipment, the message comprising information on at least two public land mobile network (PLMN) identities;
   receiving a response message from the user equipment;
   determining when the response message from the user equipment comprises at least one information field comprising at least one PLMN identity of the at least two PLMN identities transmitted by the non-shared source network to the user equipment;
   determining based on an existence of the information field comprising the at least one PLMN identity of the at least two PLMN identities, in the response message that the user equipment is configured to support network sharing and determining based on an absence of the information field comprising the at least one PLMN identity of the at least two PLMN identities in the response message that the user equipment is not configured to support network sharing; and
   transmitting information representing a result of the determining that the user equipment is configured to support the network sharing or not to the target network prior to the handover.

2. The method as claimed in claim 1, wherein the information comprising information on at least two PLMN identities is transmitted in one of the following messages: ACTIVE SET UPDATE, CELL UPDATE CONFIRM, PHYSICAL CHANNEL RECONFIGURATION, RADIO BEARER RECONFIGURATION, RADIO BEARER RELEASE, RADIO BEARER SETUP, TRANSPORT CHANNEL RECONFIGURATION, and URA UPDATE CONFIRM.

3. The method as claimed in claim 1, wherein the at least two PLMN identities in the transmitted message are the same.

4. The method as claimed in claim 1, further comprising delivering information on the at least one PLMN identity of the at least two PLMN identities representing the result of the determining that the user equipment is configured to support the network sharing or not to a target network which is configured to serve the user equipment.

5. The method as claimed in claim 1, further comprising delivering information on the capability of the user equipment representing the result of the determining that the user equipment is configured to support the network sharing or not to a target network which is configured to serve the user equipment.

6. The method as claimed in claim 1, further comprising steering a mobility of the user equipment in the non-shared network based on the network sharing capability of the user equipment.

7. A network node configured to determine when a user equipment is configured to support network sharing and is prepared for a handover from a source network serving the user equipment to a target network, the network node comprising:
   at least one processor; and
   at least one memory including computer program code,
   wherein, by executing at least portion of the computer program code with the at least one processor the network node is caused to:
      transmit, by a non-shared source network, a radio resource control message to the user equipment, the message comprising information on at least two public land mobile network (PLMN) identities,
      receive a response message from the user equipment,
      determine when the response message from the user equipment comprises at least one information field comprising at least one PLMN identity of the at least two PLMN identities transmitted by the non-shared source network to the user equipment,
      determine based on an existence of the information field comprising the at least one PLMN identity of the at least two PLMN identities, in the response message that the user equipment is configured to support network sharing and determining based on an absence of the information field comprising the at least one PLMN identity of the at least two PLMN identities in the response message that the user equipment is not configured to support network sharing, and
      transmit information representing a result of the determining that the user equipment is configured to support the network sharing or not to the target network prior to the handover.

8. The network node as claimed in claim 7, the network node is further configured to deliver information on the at least one PLMN identity of the at least two PLMN identities representing the result of the determining that the user equipment is configured to support the network sharing or not to a target network which is configured to serve the user equipment.

9. The network node as claimed in claim 7, wherein the network node is further configured to deliver information on the capability of the user equipment representing the result of the determining that the user equipment is configured to support the network sharing or not to a target network which is configured to serve the user equipment.

10. The network node as claimed in claim 7, wherein the network node is further configured to steer a mobility of the user equipment in the non-shared network on the basis of the network sharing capability of the user equipment.

11. A system for determining when a user equipment is configured to support network sharing and is prepared for a handover from a source network serving the user equipment to a target network, the system comprising:
   at least one user equipment;
   a source network configured to serve the user equipment;
   a network node residing in the source network, the network node within the system being configured to:
      transmit, by a non-shared source network, a radio resource control message to the user equipment, the message comprising information on at least two public land mobile network (PLMN) identities,
      receive a response message from the user equipment,
      determine when the response message from the user equipment comprises at least one information field comprising at least one PLMN identity of the at least two PLMN identities transmitted by the non-shared source network to the user equipment, and determine based on an existence of the information field reserved for the at least one PLMN identity of the at least two PLMN identities, in the response message that the user equipment is configured to support network sharing and determining based on an absence of the information field comprising the at least one PLMN identity of the at least two PLMN identities in the response message that the user equipment is not configured to support network sharing, and transmit information representing a result of the determining that the user equipment is configured to support the network sharing or not to the target network prior to the handover; and at least one target network configured to serve the user equipment, wherein the user equipment within the system is configured to transmit a response message to the network node in response to a receipt of the message with at least information field reserved for the at least one PLMN identity.

12. The system as claimed in claim 11, wherein the network node within the system is further configured to deliver information on the capability of the user equipment to the target network.

* * * * *